(12) United States Patent
Astier (10) Patent No.: US 10,248,737 B2
(45) Date of Patent: Apr. 2, 2019

(54) METHOD FOR DETERMINING THE STATE OF A DEVICE IN AN AIRCRAFT

(71) Applicant: AIRBUS (S.A.S.), Blagnac (FR)

(72) Inventor: Julien Astier, Garidech (FR)

(73) Assignee: Airbus (S.A.S.), Blagnac (FR)

(\*) Notice: Subject to any disclaimer, the term of this patent is extended or adjusted under 35 U.S.C. 154(b) by 700 days.

(21) Appl. No.: 14/662,983

(22) Filed: Mar. 19, 2015

(65) Prior Publication Data
US 2015/0269280 A1 Sep. 24, 2015

(30) Foreign Application Priority Data
Mar. 20, 2014 (FR) ...................................... 14 52314

(51) Int. Cl.
*G06F 17/30* (2006.01)
*G06Q 10/00* (2012.01)

(52) U.S. Cl.
CPC ....... *G06F 17/30958* (2013.01); *G06Q 10/00* (2013.01)

(58) Field of Classification Search
CPC .......................... G06F 17/30958; G06Q 10/00

USPC ................................. 707/798; 703/8; 701/16
See application file for complete search history.

(56) References Cited

U.S. PATENT DOCUMENTS

| | | | |
|---|---|---|---|
| 2004/0177058 A1* | 9/2004 | Carpentier | G06F 17/30011 |
| 2005/0187677 A1* | 8/2005 | Walker | 701/16 |
| 2012/0101793 A1* | 4/2012 | Cheriere | G05B 23/0248 703/8 |

\* cited by examiner

*Primary Examiner* — Jean B Fleurantin
(74) *Attorney, Agent, or Firm* — Jenkins, Wilson, Taylor & Hunt, P.A.

(57) ABSTRACT

A method and a system for determining the state of a device in an aircraft, this state being specified by a current version of the device as implemented in the aircraft. The method according to the invention comprises: transmitting a request to a database and receiving in response a list of updates previously performed on the device, each update specifying an earlier version and a later version; and from a directed graph, such that each edge corresponds to an update of a set of updates associated with devices of the type of the device of interest, determining a sub-graph corresponding to the list.

17 Claims, 5 Drawing Sheets

METHOD FOR DETERMINING THE STATE OF A DEVICE IN AN AIRCRAFT

CROSS-REFERENCE TO RELATED APPLICATION

This application claims priority to FR 14 52314 filed Mar. 20, 2014, the entire disclosure of which is incorporated by reference herein.

TECHNICAL FIELD

The disclosure herein relates to the field of determining the state of a device in an aircraft.

BRIEF BACKGROUND OF THE INVENTION

A device in an aircraft denotes a functional assembly that can include hardware elements and/or software elements. It can be, for example, the automatic pilot, a brake, a landing gear control system, etc. Each device can be identified by two references: the type of device (or FIN, functional item number), and the serial number of the aircraft in which it is installed.

The same device can exist in different variants called versions or standards. The versions differ from one another by one or more hardware and/or software differences. The version of a device is also called P/N (part number).

Throughout the life of an aircraft, a device of the aircraft is modified numerous times. Each modification of the device is called an update, and causes the version or "P/N" of the device to change. An update can be specified by a transition from an earlier version to a later version of the device.

An update performed before delivery of the aircraft is generally stored in a so-called MOD file. A MOD file notably comprises a reference of the MOD file, an identifier of the earlier version, and an identifier of the later version. It can also contain a detail on the possibility of modifying the update (for example to modify the later version), and a date of last modification of the update. A pre-delivery update reference is formed, for example, by a MOD file reference, possibly accompanied by a date. For one type of device, and for several aircraft, one or more databases store lists of updates implemented in succession, before delivery of the aircraft (ECDB and ICC databases).

An update performed after delivery of the aircraft is generally stored in a file called SB, standing for "Service Bulletin". An SB file notably comprises a reference of the SB file, an identifier of the earlier version, and an identifier of the later version. It can also contain a date of creation or of last modification. A post-delivery update reference is formed, for example, by an SB file reference, possibly accompanied by a date. For one type of device, and for several aircraft, one or more databases store a list of updates implemented in succession, after delivery of the aircraft (SB Comp database).

BRIEF SUMMARY OF THE INVENTION

One objective of the disclosure herein is to provide a method and a system for determining, automatically and effectively, which version of the device is present in an aircraft.

This objective is achieved with an automated method for determining the state of a device of interest of an aircraft, this state being specified by a version of the device of interest present in the aircraft.

The method according to the disclosure herein comprises the following operations implemented by one or more computers, e.g., a central processing unit:

transmitting, by one or more computers, and to at least one database, a request formed from an identifier of the aircraft;

receiving, by the one or more computers and in response to the transmitting, a list of updates previously performed on the device of interest, each update specifying an earlier version of the device of interest before the update and a later version of the device of interest after the update;

from a directed graph, stored in a memory, and such that each edge of a plurality of edges of the directed graph corresponds to one update out of a set of updates associated with devices of a type of the device of interest, determining, by the one or more computers, a sub-graph of the directed graph corresponding to the list of updates;

determining, by the one or more computers, the state of the device of interest from the sub-graph; and causing, by the one or more computers, the state of the device of interest to be displayed on a display device.

The choice of the graphs, to formalize a list of updates performed previously, makes it possible to then process the information reliably and automatically.

The use of a generic graph corresponding to all the updates available for a certain type of device, and the determination of a sub-graph of this generic graph to define a list of updates performed previously on a device of interest, makes it possible to further improve the reliability of the method according to the disclosure herein.

Preferably, the directed graph and the sub-graph are each stored in the form of an adjacent matrix, each non-zero coefficient of the adjacent matrix of the generic graph being associated with at least one update.

The determination of the state of the device of interest can implement a computation of the power N of the adjacent matrix of the sub-graph, in which N is the number of updates of the list of updates received by the central processing unit.

As a variant, the determination of the state of the device of interest can comprise, determining, for each peak of a plurality of peaks of the sub-graph, the indegree and the outdegree of the peak and comparing the indegree and the outdegree.

The indegrees and outdegrees are advantageously stored in the form of a vector of indegrees and a vector of outdegrees, each component of the vector of indegrees being associated with a later version of the device of interest, and each component of the vector of outdegrees being associated with an earlier version of the device of interest.

The comparison between the indegree and the outdegree can comprise the selection of at least one first peak of the sub-graph, of which the indegree is greater than the outdegree.

According to a first embodiment, a single first peak is obtained of which the indegree is greater than the outdegree, the state of the device of interest being based on, e.g., defined by, the later version associated with this single first peak.

According to a second embodiment, at least two first peaks are obtained of which the indegree is greater than the outdegree, the method comprising the following steps:

comparing the sub-graph and the generic graph, and identifying at least one edge of the sub-graph omitted and/or errored;

correcting the sub-graph;

for each peak of the corrected sub-graph, determining the indegree and of the outdegree, then comparing the indegree and the outdegree.

Preferably, the comparison and identification step comprises:

selecting at least two second peaks of the sub-graph, such that the indegree is less than the outdegree; and searching, in the directed graph, for a missing edge going from one of the second peaks to one of the first peaks;

wherein correcting the sub-graph comprises adding the missing edge to the sub-graph.

The method according to the disclosure herein advantageously comprises a correction of the list of updates stored in the database, to make it correspond to the corrected particular sub-graph.

The list of updates can distinguish updates performed before delivery of the aircraft and updates performed after delivery of the aircraft, and the method can comprise:

determining the state of the device, just after delivery of the aircraft, using a first generic graph such that each edge corresponds to an update before delivery, and using the updates from the list performed before delivery of the aircraft;

when the determination of the state of the device after delivery has implemented a correction of a particular sub-graph, correcting the list of updates;

determining the state of the device, using a second generic graph such that each edge corresponds to an update before or after delivery, and using the corrected list of updates if it exists or the list of updates otherwise.

The method according to the disclosure herein can comprise storing, in the memory, a triplet corresponding to a particular sub-graph and comprising the vector of the indegrees, the vector of the outdegrees, and the state of the device of interest.

The method according to the disclosure herein can comprise storing, in the memory, a first adjacent matrix of a particular sub-graph associated with a first instant $t_1$, the method comprising:

transmitting, at a second instant $t_2$ after the first instant $t_1$, a request (R) formed from an identifier of the aircraft, and receiving, in response, a list of updates previously performed on the device of interest;

determining a particular sub-graph associated with the second instant $t_2$, stored in the form of a second adjacent matrix;

subtracting the first adjacent matrix from the second adjacent matrix, to obtain a matrix of the modifications;

determining the vector of indegrees and the vector of outdegrees associated with the matrix of modifications, to deduce therefrom the state of the device of interest at the second instant $t_2$.

When the state of the device of interest as determined corresponds to a version identified as obsolete, the device of interest of the aircraft can be updated to a non-obsolete version of the device.

The disclosure herein also relates to a system for implementing a method according to the disclosure herein, the system comprising:

at least one database, storing, for each aircraft of a plurality of aircrafts, a list of updates previously performed on a device of interest;

one or more processors;

a memory storing a directed graph and instructions that, when executed by the one or more processors, cause the one or more processors to perform operations comprising:

transmitting, to the database, a request formed from an identifier of an aircraft;

receiving, in response to the transmitting, a list of updates previously performed on the device of interest, each update specifying an earlier version of the device of interest before the update and a later version of the device of interest after the update;

from the directed graph, wherein the directed graph is constructed such that each edge of a plurality of edges of the directed graph corresponds to one update out of a set of updates associated with devices of a type of the device of interest, determining a sub-graph of the directed graph corresponding to the list of updates;

determining the state of the device of interest from the sub-graph; and causing the state of the device of interest to be displayed on a display device.

BRIEF DESCRIPTION OF THE DRAWINGS

The disclosure herein will be better understood on reading the description of exemplary embodiments given purely as an indication and in a nonlimiting manner, with reference being made to the attached drawings in which.

DETAILED DESCRIPTION

Figure 1:
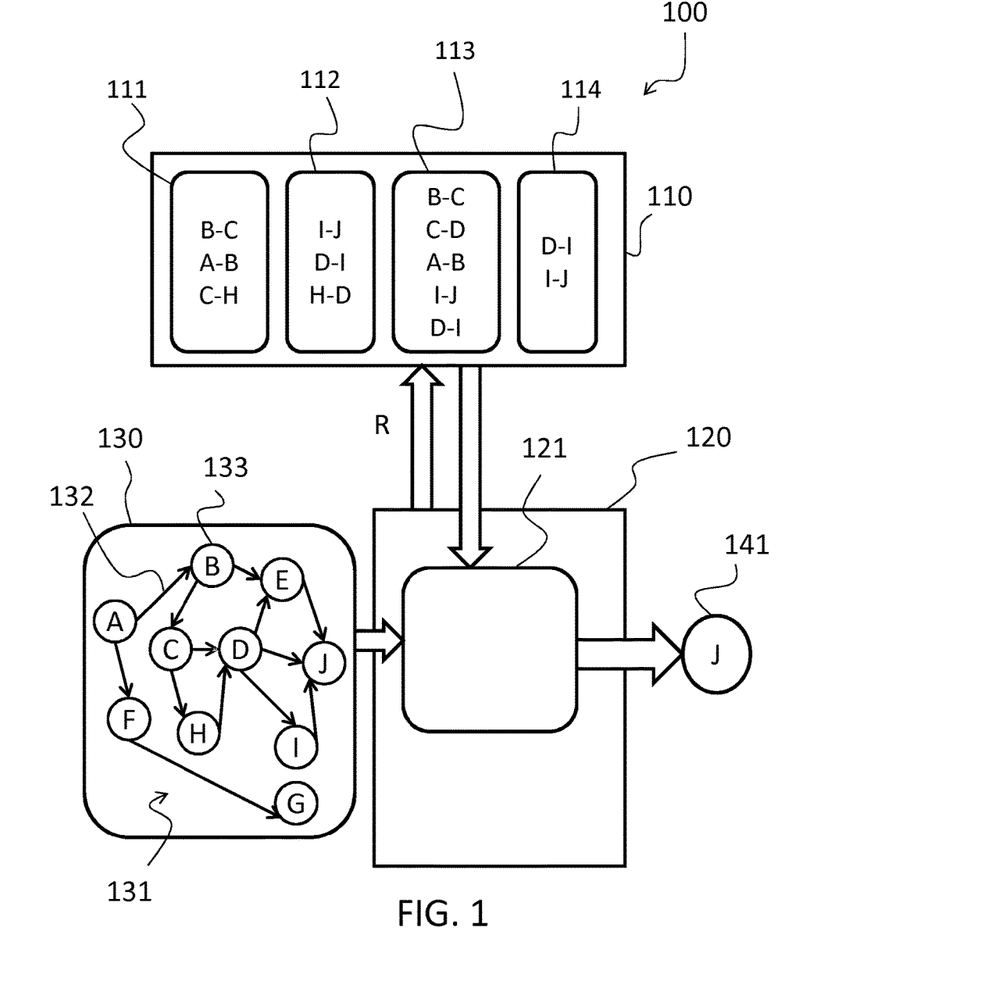
FIG. 1 schematically illustrates a system according to the disclosure herein, for determining the state of a device of interest of an aircraft.

The system 100 according to the disclosure herein is suitable for implementing a method according to the disclosure herein, as described hereinbelow. The system 100 is intended to determine, in an entirely automated and reliable way, the state of a device of interest. A "device of interest" is a device of a predetermined type, and situated in a given aircraft called aircraft of interest.

The system comprises at least one database 110. The database contains lists of updates previously performed on a device of the type of that of the aircraft of interest. Each list 111, 112, 113, 114 is associated with one device and aircraft in particular. The devices are of the same type, that is to say that they fulfil the same main function.

Each update can be identified by a reference, for example a MOD or SB file reference, which can be accompanied by a date. Numerous other ways of referencing an update will be able to be envisaged. In practice, it is this reference which is advantageously stored in the database 110, with a look-up table linking a reference to an earlier version and a later version. The updates identified by the same reference belong to the same type of update.

In FIG. 1, each update is identified by a reference formed as follows: "earlier version-later version". For example, the list 111 contains the following updates: version B to C; version A to B; version C to H. The chronological order of implementation of these updates is unknown.

The at least one database 110 can consist of a set of known databases. According to a preferred variant, the database 110 is unique, entirely devoted to the disclosure herein, and combines, in a single information source, different data from various known databases. The database 110 then contains only the information that is useful to the disclosure herein (for example lists of update references, and a look-up table of references).

Each time an update is implemented on a device of the type of the device of interest, the database 110 is brought up to date. There is thus produced, for each device of a certain type and for each aircraft, a list that is as exhaustive as possible of the updates performed.

The system 100 according to the disclosure herein comprises a central processing unit 120, with a motherboard, computation structure 121 (processor), and a memory such as a hard disk. A central processing unit is the main element of a computer.

The central processing unit is connected to the database by wired or wireless connection (not represented), and is suitable for:
transmitting a request R to the database 110, formed from the identifier of the aircraft of interest; and
receiving, in return, the list of updates, associated with the aircraft of interest. The central processing unit 120 therefore receives one of the lists 111, 112, 113 or 114.

The central processing unit can comprise an interface for interfacing with the database (not represented), suitable for formulating the request R and for receiving the list of updates.

The system 100 according to the disclosure herein also comprises a memory 130. The memory 130 can form an integral part of the central processing unit 120, or be separate from the central processing unit.

The memory 130 stores a directed graph, called generic graph 131, such that each edge corresponds to one type of update out of a set of update types available, associated with the type of device concerned. A graph is a formalization of the information in the form of a set of peaks linked by one or more edges. It is called a "directed graph" because a direction of circulation from one peak to another is defined, each peak being a point of departure and/or a point of arrival of an edge. Each peak 133 of the generic graph corresponds to a version of an update. An update corresponds to an edge of the graph. Each edge of the generic graph is associated with one or more update references. For example, the edge 132 corresponds to an update for changing from version A to B.

The generic graph can be stored in the memory 130 in the form of an adjacent matrix (two-dimensional matrix, in which a first dimension corresponds to the earlier versions, and a second dimension corresponds to the later versions). Each non-zero coefficient of this adjacent matrix is associated with one or more update references.

The generic graph is such that each edge corresponds to one of the types of updates existing in at least one of the lists of the database. The generic graph can be produced using the information stored in the database 110. For this, an inventory is produced that is as exclusive as possible of all the types of updates, associated with the type of device concerned and itemized in the database 110.

The generic graph can be updated automatically, as soon as the database 110 receives a new update, corresponding to a type of update not yet itemized in the generic graph. For this, a computer for computing the generic graph (not represented) can be provided that are connected to the database 110 and to the memory 130, and that are suitable for comparing each update added to a list of the database, with an inventory of the types of update already taken into account in the generic graph. When a type of update that has not yet been taken into account in the generic graph is detected, the generic graph is modified to include this new type of update therein.

The updates of the generic graph and of the database 110 can be updates before delivery or after delivery. Cross-checking of information contained in different databases can be produced. For example, each update after delivery is defined in two databases. A first database contains only the earlier and later versions. A second database contains a breakdown, as far as possible, of an update after delivery into one or more updates before delivery. The first database is more reliable when the earlier and/or later version cannot be reached by updates before delivery. The second database is more reliable in the other cases. Comparing these two databases is a way of correcting any errors of definition of an update after delivery.

The central processing unit 120 comprises computation structure that can be referred to as a processor 121 connected to the memory 130 and to the database 110. The computer 120 receives as input the generic graph 131, and the list of updates 113, associated with the device of interest. The list 113 contains the following updates: version B to C; version C to D; version A to B; version I to J; and version D to I.

The processor 121 is suitable, from the generic graph 131 and the list 113, for determining a particular sub-graph of the generic graph 131, corresponding to the updates of the list 131. From the particular sub-graph, the computer deduces therefrom the state of the device of interest. The state of the device of interest designates the version of this device present in the aircraft, also called current state of the device of interest, or actual state of the device of interest, or state of the device of interest at the time of transmission of the list of updates.

The central processing unit can be connected to a human-machine interface (not represented), suitable for displaying, on a screen, the state of the device of interest. These human-machine interface can also be suitable for receiving information relating to the identifier of the aircraft, making it possible to formulate the request R. The human-machine interface is, for example, a keyboard and a screen, or a touchscreen.

According to a variant that is not represented, the request R is formed from an identifier of an aircraft of interest, and an identifier of a type of device. The database 110 then presents a number of families of lists, each associated with a type of device, and the memory 130 then presents a number of generic graphs, each associated with a type of device.

Figure 2:
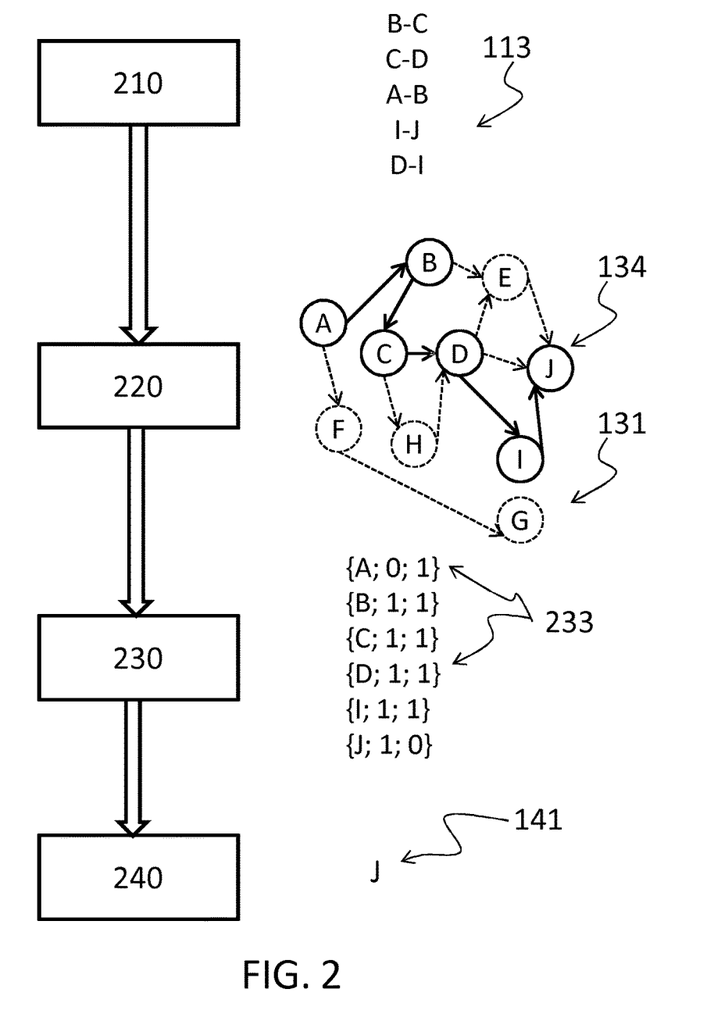
FIG. 2 schematically illustrates a first embodiment of the method according to the disclosure herein, for determining the state of a device of interest of an aircraft.

There now follows a description, with reference to FIG. 2, of a first embodiment of a method according to the disclosure herein, implemented in the system 100. This is an automated method, that is to say one which does not require human intervention.

In a first step 210, the central processing unit transmits to the database the request R as defined previously, and receives, in return, the list 113 of updates previously performed on the device of interest.

In a step 220, the central processing unit takes into account the generic graph 131 as defined previously, and the list 113, to determine the particular sub-graph as defined previously. In FIG. 2, the particular sub-graph 134 is identified by solid lines, the rest of the generic graph 131 being represented by dotted lines.

The adjacent matrix corresponding to the generic graph, such that each non-zero coefficient is associated with at least one type of update, is as follows:

|   | A | B | C | D | E | F | G | H | I | J |
|---|---|---|---|---|---|---|---|---|---|---|
| A |   |   |   |   |   |   |   |   |   |   |
| B | A-B |   |   |   |   |   |   |   |   |   |
| C |   | B-C |   |   |   |   |   |   |   |   |
| D |   |   | C-D |   |   |   |   | H-D |   |   |
| E |   | B-E |   | D-E |   |   |   |   |   |   |
| F | A-F |   |   |   |   |   |   |   |   |   |
| G |   |   |   |   |   | F-G |   |   |   |   |
| H |   |   | C-H |   |   |   |   |   |   |   |
| I |   |   |   | D-I |   |   |   |   |   |   |
| J |   |   |   | D-J | E-J |   |   |   | I-J |   |

Each column corresponds to an earlier version. Each row corresponds to a later version. The empty cells correspond to zero coefficients of the matrix.

The adjacent matrix corresponding to the particular sub-graph is as follows:

|   | A | B | C | D | E | F | G | H | I | J |
|---|---|---|---|---|---|---|---|---|---|---|
| A |   |   |   |   |   |   |   |   |   |   |
| B | 1 |   |   |   |   |   |   |   |   |   |
| C |   | 1 |   |   |   |   |   |   |   |   |
| D |   |   | 1 |   |   |   |   | 0 |   |   |
| E |   | 0 |   | 0 |   |   |   |   |   |   |
| F | 0 |   |   |   |   |   |   |   |   |   |
| G |   |   |   |   |   | 0 |   |   |   |   |
| H |   |   | 0 |   |   |   |   |   |   |   |
| I |   |   |   | 1 |   |   |   |   |   |   |
| J |   |   |   | 0 | 0 |   |   |   | 1 |   |

The coefficients of this matrix are zero for updates that are not contained in the list 113, and x for updates that are contained x times in the list 113, x being an integer greater than or equal to unity.

In a step 230, the central processing unit computes, for each peak of the particular sub-graph, the indegree (number of edges having this peak as point of arrival) and the outdegree (number of edges having this peak as point of departure). Triplets 233 are obtained, each comprising a version of the device of interest, a value of the indegree, and a value of the outdegree. These triplets can be stored in the form of a vector of indegrees and a vector of outdegrees. Each component of the vector of indegrees corresponds to a later version of the device of interest. Each component of the vector of outdegrees corresponds to an earlier version of the device of interest. Preferably, the vectors of indegrees and outdegrees comprise as many components as there are peaks in the generic graph.

During a step 240, the central processing unit compares the indegrees and outdegrees, to deduce therefrom the state of the device of interest on completion of the updates of the list 113.

The following are represented below:
the vector of indegrees (for each row, sum of the coefficients of the adjacent matrix associated with the particular sub-graph);

the vector of outdegrees (for each column, sum of the coefficients of the adjacent matrix associated with the particular sub-graph); and an interpretation, for each version of the device (or peak), of the comparison between the associated coefficient, in the vector of indegrees and in the vector of outdegrees.

|   | Indegrees | Outdegrees | Status of the peak |
|---|---|---|---|
| A | 0 | 1 | Departure |
| B | 1 | 1 | Intermediate |
| C | 1 | 1 | Intermediate |
| D | 1 | 1 | Intermediate |
| E | 0 | 0 | — |
| F | 0 | 0 | — |
| G | 0 | 0 | — |
| H | 0 | 0 | — |
| I | 1 | 1 | Intermediate |
| J | 1 | 0 | Arrival |

There are in particular the following interpretations:

| Indegree | Outdegree | Status of the peak |
|---|---|---|
| 1 | 0 | Arrival |
| 1 | 1 | Intermediate point |
| 0 | 1 | Departure |
| N integer ≥ 2 | N | Node |
| N integer ≥ 2 | N − 1 | Node and arrival |

If neither a point of departure nor a point of arrival is identified, but a node is identified, then this node is at the same time a node, the departure and the arrival. In the example illustrated here, a single version is identified such that the indegree is greater than the outdegree. This is the state 141 of the device on completion of the updates of the list 113, here the version J.

In practice, an index i can be sought such that the component of index i of the vector of the indegrees is greater than the component of index i of the vector of the outdegrees.

The knowledge of the current state of the device makes it possible, for example, to best interpret failure messages originating from this device, or to schedule an update if the current version of the device of interest is obsolete. The method according to the disclosure herein can also make it possible to reliably and automatically manage the scheduling of maintenance steps over an entire fleet of aircrafts.

This embodiment of the disclosure herein is particularly advantageous. As detailed hereinbelow, it makes it possible to identify and correct a possible error or omission in the list of updates. It is thus possible to determine, reliably, which version of the device is present in the aircraft, and to do so even if the list of the updates previously performed is errored and/or incomplete. This embodiment further makes it possible to have the updates chronologically sequenced.

Figure 3:
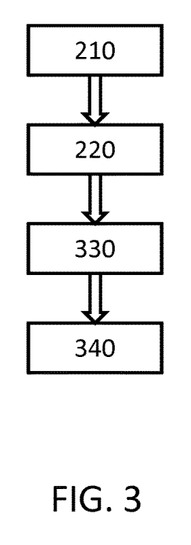
FIG. 3 schematically illustrates a second embodiment of the method according to the disclosure herein, for determining the state of a device of interest of an aircraft.

FIG. 3 schematically illustrates a second embodiment of the method according to the disclosure herein. This second embodiment differs from the first embodiment in that it does not comprise the steps of computation of the indegrees and outdegrees, and comparisons, two-by-two, of the indegrees and outdegrees to deduce therefrom the state of the device of interest.

Following the step 220, the second embodiment of the method according to the disclosure herein comprises:
a step 330 of determining the number N of edges of the particular sub-graph (or number of updates in the list previously transmitted), and of setting the adjacent matrix corresponding to the particular sub-graph to the power N. A matrix is then obtained that is called final matrix; and a step 340 of determining the state of the device of interest, from the final matrix. The final matrix shows only zero coefficients, except one. This single non-zero coefficient is associated with an update, the later version of which is the state of the device of interest.

The second embodiment of the method according to the disclosure herein requires few computation resources. It nevertheless presents the drawback of allowing only simple cases to be processed, notably without omission of an update in the list of updates, even without return to a former version.

Figure 4:
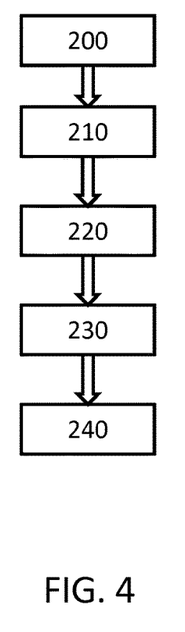
FIG. 4 schematically illustrates a first variant of the first embodiment of the method according to the disclosure herein.

FIG. 4 schematically illustrates a first variant of the first embodiment of the method according to the disclosure herein. This first variant differs from the method illustrated in FIG. 2 in that it comprises a step 200 of producing the generic graph. This step 200 includes a sorting of the updates itemized in the database. The updates are sorted into update types. The different types of update are then organized in a graph.

This step 200 will also be able to be combined with the second embodiment of the method according to the disclosure herein.

Figure 5:
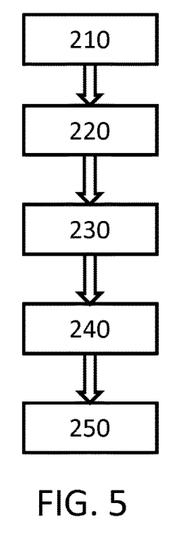
FIG. 5 schematically illustrates a second variant of the first embodiment of the method according to the disclosure herein.

FIG. 5 schematically illustrates a second variant of the first embodiment of the method according to the disclosure herein. This second variant differs from the method illustrated in FIG. 2 in that it comprises a step 250 of maintenance of the aircraft of interest. The step 250 is implemented after determination of the state of the device of interest, and if this state corresponds to an obsolete version of the device of interest. The step 250 comprises or consists in modifying the current version of the device of interest to replace it with a new, non-obsolete version, for example in the context of the servicing of a fleet of aircrafts. As a variant, the step 250 is implemented to replace a version of the device of interest identified as exhibiting a quality defect.

This step 250 will also be able to be combined with the second embodiment of the method according to the disclosure herein.

Figure 6:
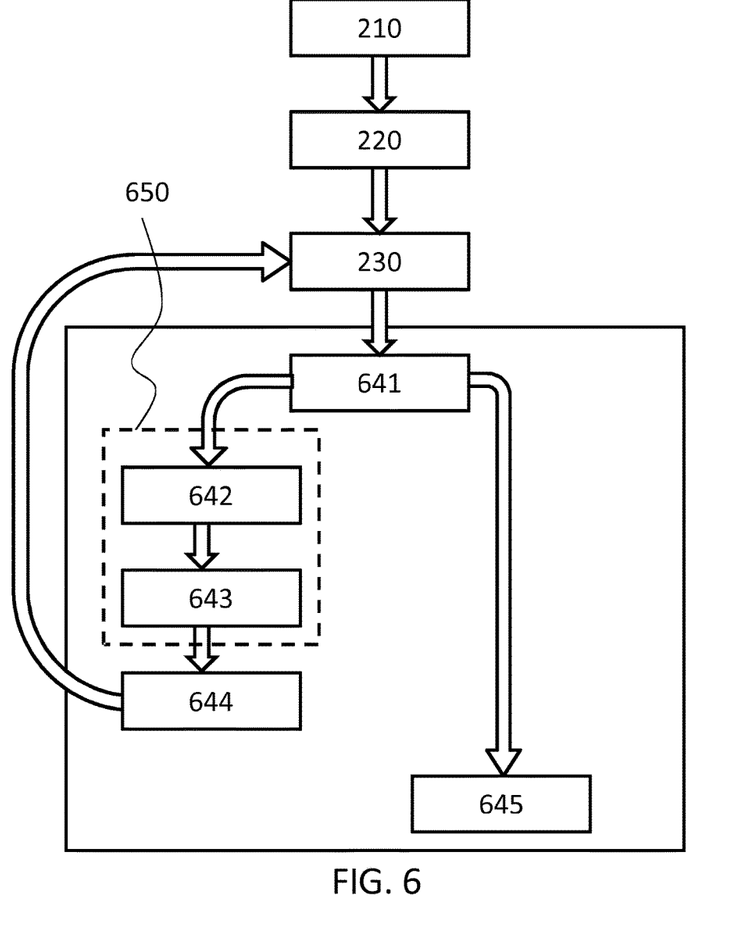
FIG. 6 schematically illustrates a third variant of the first embodiment of the method according to the disclosure herein.

FIG. 6 schematically illustrates a third variant of the first embodiment of the method according to the disclosure herein. According to this variant, a determination is carried out, in a sub-step 641, as to whether there are one or more versions (or peaks), such that the indegree is less than the outdegree.

In the case where there is a single version such that the indegree is greater than the outdegree, the state of the device of interest is defined by this single version (sub-step 645). This case corresponds to the case of FIG. 2.

Hereinbelow, the case is detailed in which there are several versions such that the indegree is greater than the outdegree. Take the following example:

| | Adjacent matrix associated with the generic graph: | | | | | | Adjacent matrix associated with the particular sub-graph previously determined: | | | | | |
|---|---|---|---|---|---|---|---|---|---|---|---|---|---|
| | A | B | C | D | E | F | | A | B | C | D | E | F |
| A | | | | | | | A | | | | | | |
| B | A- | | | | | | B | 1 | | | | | |
| C | | B- | | | F- | | C | | 1 | | | | 0 |
| D | | | C- | | E- | | D | | | 0 | | 1 | |
| E | | | | | | F- | E | | | | | | 0 |
| F | | | C- | | | | F | | | 1 | | | |

| | Indegrees | Outdegrees | Status of the peak |
|---|---|---|---|
| A | 0 | 1 | Departure |
| B | 1 | 1 | Intermediate |
| C | 1 | 1 | Intermediate |
| D | 1 | 0 | Arrival |
| E | 0 | 1 | Departure |
| F | 1 | 0 | Arrival |

At this stage, it is not known whether the current state of the device of interest is the version D or F. The human-machine interface as described previously will ultimately be able to display these several possible states.

The following sub-steps are implemented:

sub-step 642: search for at least two versions (or peaks), such that the indegree is less than the outdegree, here the versions A and E. For example, two indices j are sought, such that the component of index j of the vector of the indegrees is less than the component of index j of the vector of the outdegrees;

sub-step 643: search, in the generic graph, for an edge, called missing edge, going from one of the versions such that the indegree is less than the outdegree (versions A and E), to one of the versions such that the indegree is greater than the outdegree (versions D and F).

In other words, a search is performed in the generic graph to see if there is an edge corresponding to the update A to D, A to F, E to D, or E to F. For example, it is searched, in the adjacent matrix associated with the generic graph, for a non-zero coefficient {i, j}, the index i being such that the components of index i of the vector of the indegrees are greater than the components of index i of the vector of the outdegrees. In this adjacent matrix, the potential missing edges are identified by a "?" symbol.

| | A | B | C | D | E | F |
|---|---|---|---|---|---|---|
| A | | | | ? | | ? |
| B | A-B | | | | | |
| C | | B-C | | | | F-C |
| D | | | C-D | | E-D | |
| E | | | | ? | | ?F- |
| F | | | C-F | | | |

It can be seen that, out of the potential missing edges, only one corresponds to an edge that exists in the generic graph. This therefore constitutes the missing edge. In other words, the list of updates supplied by the database was incomplete, and it lacked the update F to E, corresponding to the missing edge.

The sub-steps 642 and 643 together form a sub-step 650 of comparison between the particular sub-graph and the generic graph, and identification of at least one edge of the particular sub-graph that is omitted or errored. It will be possible to imagine numerous variants, that make it possible, by comparison between the particular sub-graph and the generic graph, to identify an error or an omission in the list of updates, when the particular sub-graph is not consistent with the generic graph.

In the sub-step 644, the particular sub-graph previously determined is corrected to introduce therein the missing edge (or missing update). The following new particular sub-graph, called corrected particular sub-graph, is obtained:

|   | A | B | C | D | E | F |
|---|---|---|---|---|---|---|
| A |   |   |   |   |   |   |
| B | 1 |   |   |   |   |   |
| C |   | 1 |   |   |   | 0 |
| D |   |   | 0 |   | 1 |   |
| E |   |   |   |   |   | 1 |
| F |   |   | 1 |   |   |   |

Then, the steps of the method according to the disclosure herein are reiterated from the step 230 of determining the indegrees and outdegrees, and by considering the corrected particular sub-graph. The following new vectors are obtained:

|   | Indegrees | Outdegrees | Status of the |
|---|---|---|---|
| A | 0 | 1 | Departure |
| B | 1 | 1 | Intermediate |
| C | 1 | 1 | Intermediate |
| D | 1 | 0 | Arrival |
| E | 1 | 1 | Intermediate |
| F | 1 | 1 | Intermediate |

Then, the new vector of indegrees and the new vector of outdegrees are compared. The sub-step 641 is once again implemented, and this time, a single version is identified, such that the indegree is greater than the outdegree. The state of the device of interest is then determined (sub-step 645), as defined by this single version (D). It is, more specifically, the most probable state of the device of interest.

This variant makes it possible to easily identify an error, or an omission, in the list of updates supplied by the database. A step of correction of the list stored in the database can be provided, for example to include therein the update associated with the missing edge.

The human-machine interface as described previously supplies the list of the several possible states of the device. In this list, the most probable state is identified.

In the case where two possible missing edges can be identified, corresponding to two possible options, the method can be continued for each of these two options. Two corrected particular sub-graphs are then obtained. One of them will exhibit more inconsistencies than the other. The corrected particular sub-graph exhibiting the fewer inconsistencies is retained, whereas the other option is discarded.

The disclosure herein can be refined by differentiating the updates before delivery and the updates after delivery, and by making the assumption that the sub-list of the updates before delivery is complete. Thus, the search for an omitted update is simplified, because it can be only an update after delivery. Such an assumption is realistic.

It is also possible to make the assumption that, until the delivery of the aircraft, the state of the device of interest is known. The lists of updates located in the database and the generic graph then designate only the updates performed after delivery of the aircraft. It is possible to check that the departure version of the particular sub-graph corresponds to the state of the device of interest at the time of the delivery of the aircraft.

Figure 7:
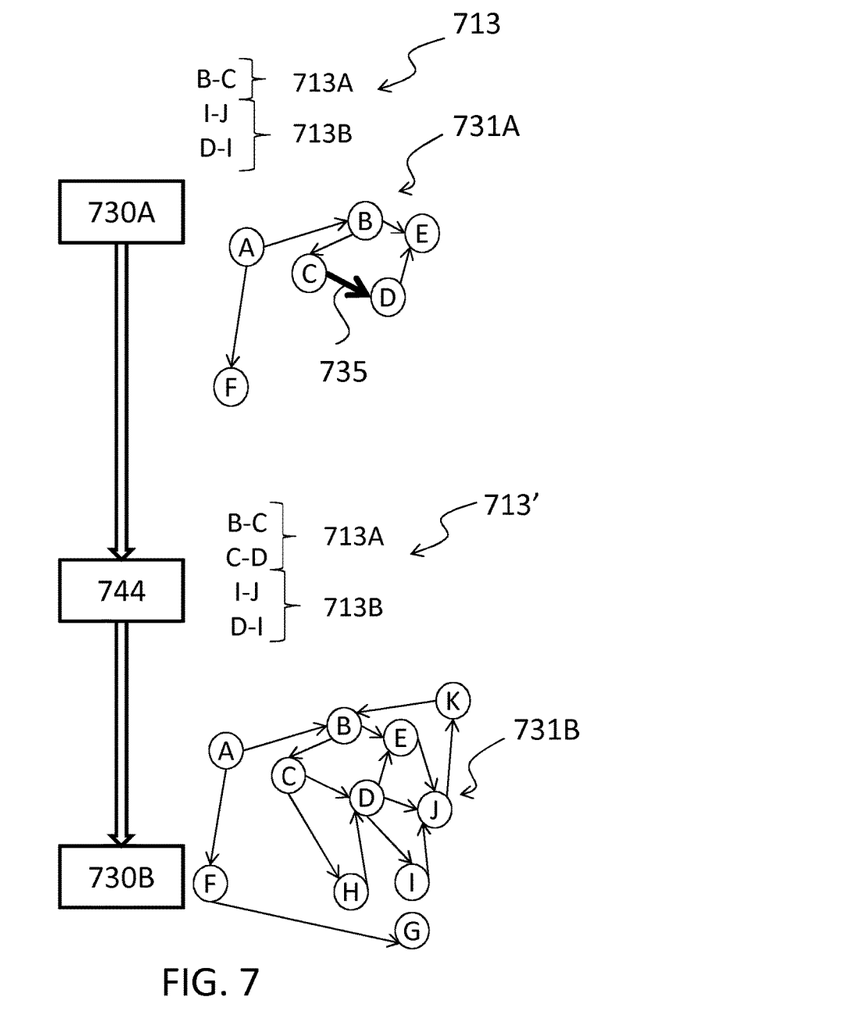
FIG. 7 schematically illustrates a fourth variant of the first embodiment of the method according to the disclosure herein.

FIG. 7 schematically illustrates a fourth variant of the first embodiment of the method according to the disclosure herein. According to this variant, an update performed before delivery 713A, and an update performed after delivery 713B, are distinguished in each list of updates 713. The memory stores:

a first generic graph 731A, such that each edge corresponds to an update performed before delivery; and a second generic graph 731B, such that each edge corresponds to an update, performed before or after delivery.

On reception of the list 713, the updates 713A performed before delivery are selected from the list. A particular sub-graph of the first generic graph 731A, called first sub-graph, is then determined. The first sub-graph corresponds to the updates of the list, performed before delivery. This first sub-graph is used to determine the state of the device of the aircraft immediately after delivery (step 730A).

If appropriate, the first sub-graph is corrected as explained with reference to FIG. 6 (step 744). In the example represented in FIG. 7, the first sub-graph is corrected, to add to it the missing edge 735. The list 713 is then corrected to add the update "C-D" corresponding to the missing edge 735. The corrected list 713' is obtained.

Then, a particular sub-graph of the second generic graph 731B, called second sub-graph, is determined. The second sub-graph corresponds to all the updates of the list 713 (or 713' if the list 713 has been corrected). This second sub-graph is used to determine the current state of the device of the aircraft (step 730B). If appropriate, one or more corrections of the second sub-graph are implemented, as explained with reference to FIG. 6.

Numerous refinements, not represented, can be provided.

For example, the human-machine interface can provide the particular sub-graph.

The generic graph may show details on the date of creation or of modification of the types of updates. This date can then be taken into consideration to identify an inconsistency in the particular sub-graph.

A triplet comprising a vector of the indegrees, a vector of the outdegrees, and a state of the device of interest as determined, can be stored in a memory. Thus, when, subsequently, the same vectors of the indegrees and outdegrees are obtained, it will be directly possible to deduce therefrom a state of the device of interest from the experience acquired previously.

A history of a device of interest can be taken into account.

According to a variant of the first embodiment of the method according to the disclosure herein, an adjacent matrix associated with a particular sub-graph and with an instant t is stored in a memory.

When, subsequently, the new state of the same device of interest has to be determined, it will be sufficient to implement the following steps:

transmission, at a second instant t+Δt, of a request formed from an identifier of the same aircraft, and reception, in response, of a list of the updates performed prior to this second instant t+Δt;

determination of the particular sub-graph associated with this second instant t+Δt, and of the corresponding adjacent matrix;

subtraction of the adjacent matrix associated with the instant t, from the adjacent matrix associated with the instant t+Δt, to obtain a matrix of modifications associated with only updates performed between the instants t and t+Δt;

determination of the vectors of indegrees and outdegrees associated with the matrix of modifications, to deduce therefrom the state of the device of interest at the second instant t+Δt.

According to a variant of the second embodiment of the method of the disclosure herein, a first final matrix corresponding to a first instant t is stored in a memory. Subsequently, a second final matrix associated with the instant t+Δt is determined.

The second final matrix is multiplied by the first final matrix set to the power M, where M is an integer corresponding to the number of updates performed between the instants t (excluded) and t+Δt (included). A third final matrix is thus obtained which shows only zero coefficients, except for one non-zero coefficient. This non-zero coefficient is associated with an update, the later version of which corresponds to the state of the device of interest at the instant t+Δt.

The subject matter described herein may be implemented in software in combination with hardware and/or firmware. For example, the subject matter described herein may be implemented in software executed by a processor. In one exemplary implementation, the subject matter described herein may be implemented using a computer readable medium having stored thereon computer executable instructions that when executed by the processor of a computer control the computer to perform steps. Exemplary computer readable media suitable for implementing the subject matter described herein include non-transitory devices, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A method for determining a state of a device of interest in an aircraft, this state specifying a version of the device of interest present in the aircraft, the method comprising:
    transmitting, by one or more computers, and to at least one database, a request formed from an identifier of the aircraft;
    receiving, by the one or more computers and in response to the transmitting, a list of updates previously performed on the device of interest, each update specifying an earlier version of the device of interest before the update and a later version of the device of interest after the update, wherein the device of interest comprises a functional assembly including hardware elements and software elements, and wherein the earlier versions of the device of interest are different from the later versions of the device of interest by one or more of a group consisting of hardware and software differences;
    from a directed graph, stored in a memory, and such that each edge of a plurality of edges of the directed graph corresponds to one update out of a set of updates associated with devices of a type of the device of interest, determining, by the one or more computers, a sub-graph of the directed graph corresponding to the list of updates, wherein the directed graph and the sub-graph are each stored in a form of an adjacent matrix, each non-zero coefficient of the adjacent matrix of the generic graph being associated with at least one update;
    determining, by the one or more computers, the state of the device of interest from the sub-graph; and
    causing, by the one or more computers, the state of the device of interest to be displayed on a display device.

2. The method of claim 1, comprising setting, by the one or more computers, the adjacent matrix of the sub-graph to power N, in which N is the number of updates of the list of updates received by the one or more computers.

3. The method of claim 1, comprising, when the state of the device of interest as determined corresponds to a version identified as obsolete, updating the device of interest of the aircraft to a non-obsolete version of said device.

4. A method for determining a state of a device of interest in an aircraft, this state specifying a version of the device of interest present in the aircraft, the method comprising:
    transmitting, by one or more computers, and to at least one database, a request formed from an identifier of the aircraft;
    receiving, by the one or more computers and in response to the transmitting, a list of updates previously performed on the device of interest, each update specifying an earlier version of the device of interest before the update and a later version of the device of interest after the update, wherein the device of interest comprises a functional assembly including hardware elements and software elements, and wherein the earlier versions of the device of interest are different from the later versions of the device of interest by one or more of a group consisting of hardware and software differences;
    from a directed graph, stored in a memory, and such that each edge of a plurality of edges of the directed graph corresponds to one update out of a set of updates associated with devices of a type of the device of interest, determining, by the one or more computers, a sub-graph of the directed graph corresponding to the list of updates;
    determining, by the one or more computers, for each peak of a plurality of peaks of the sub-graph, the indegree and the outdegree of the peak and comparing the indegree and the outdegree, wherein the indegrees and outdegrees are stored in the form of a vector of indegrees and a vector of outdegrees, each component of the vector of indegrees being associated with a later version of the device of interest, and each component of the vector of outdegrees being associated with an earlier version of the device of interest;
    determining, by the one or more computers, the state of the device of interest from the sub-graph; and
    causing, by the one or more computers, the state of the device of interest to be displayed on a display device.

5. The method of claim 4, wherein comparing the indegree and the outdegree comprises selecting at least one first peak of the sub-graph, of which the indegree is greater than the outdegree.

6. The method of claim 5, wherein the state of the device of interest is determined based on the later version associated with the first peak.

7. The method of claim 4, comprising determining at least two first peaks of which the indegree is greater than the outdegree, the method comprising:

comparing the sub-graph and the generic graph, and identifying at least one edge of the sub-graph omitted and/or errored;

correcting the sub-graph;

for each peak of the corrected sub-graph, determining the indegree and of the outdegree, then comparing the indegree and the outdegree.

8. The method of claim 7, wherein comparing and identifying comprises:

selecting at least two second peaks of the sub-graph, such that the indegree is less than the outdegree; and searching, in the directed graph, for a missing edge going from one of the second peaks to one of the first peaks;

wherein correcting the sub-graph comprises adding the missing edge to the sub-graph.

9. The method of claim 7, comprising making a correction of the list of updates stored in the database, to make the list of updates correspond to the corrected sub-graph.

10. The method of claim 7, wherein the list of updates distinguishes updates performed before delivery of the aircraft and updates performed after delivery of the aircraft, and wherein the method comprises:

determining the state of the device, just after delivery of the aircraft, using a first generic graph such that each edge corresponds to an update before delivery, and using the updates from the list performed before delivery of the aircraft;

when the determination of the state of the device after delivery has implemented a correction of a particular sub-graph, correcting the list of updates;

determining the state of the device, using a second generic graph such that each edge corresponds to an update before or after delivery, and using the corrected list of updates if it exists or the list of updates otherwise.

11. The method of claim 4, comprising storing, in the memory, a triplet corresponding to a particular sub-graph and comprising the vector of the indegrees, the vector of the outdegrees, and the state of the device of interest.

12. The method of claim 4, comprising storing, in the memory, a first adjacent matrix of a particular sub-graph associated with a first instant $t_1$, the method comprising:

transmitting, at a second instant $t_2$ after the first instant $t_1$, a request (R) formed from an identifier of the aircraft, and receiving, in response, a list of updates previously performed on the device of interest;

determining a particular sub-graph associated with the second instant $t_2$, stored in the form of a second adjacent matrix;

subtracting the first adjacent matrix from the second adjacent matrix, to obtain a matrix of the modifications;

determining the vector of indegrees and the vector of outdegrees associated with the matrix of modifications, to deduce therefrom the state of the device of interest at the second instant $t_2$.

13. A system comprising:

at least one database, storing, for each aircraft of a plurality of aircrafts, a list of updates previously performed on a device of interest;

one or more processors;

a memory storing a directed graph and instructions that, when executed by the one or more processors, cause the one or more processors to perform operations comprising:

transmitting, to the database, a request formed from an identifier of an aircraft;

receiving, in response to the transmitting, a list of updates previously performed on the device of interest, each update specifying an earlier version of the device of interest before the update and a later version of the device of interest after the update, wherein the device of interest comprises a functional assembly including hardware elements and software elements, and wherein the earlier versions of the device of interest are different from the later versions of the device of interest by one or more of a group consisting of hardware and software differences;

from the directed graph, wherein the directed graph is constructed such that each edge of a plurality of edges of the directed graph corresponds to one update out of a set of updates associated with devices of a type of the device of interest, determining a sub-graph of the directed graph corresponding to the list of updates, wherein the directed graph and the sub-graph are each stored in a form of an adjacent matrix, each non-zero coefficient of the adjacent matrix of the generic graph being associated with at least one update;

determining the state of the device of interest from the sub-graph; and causing the state of the device of interest to be displayed on a display device.

14. The system of claim 13, the operations comprising setting the adjacent matrix of the sub-graph to power N, in which N is the number of updates of the list of updates received.

15. The system of claim 13, the operations comprising determining for each peak of a plurality of peaks of the sub-graph, the indegree and the outdegree of the peak and comparing the indegree and the outdegree.

16. The system of claim 15, wherein the indegrees and outdegrees are stored in the form of a vector of indegrees and a vector of outdegrees, each component of the vector of indegrees being associated with a later version of the device of interest, and each component of the vector of outdegrees being associated with an earlier version of the device of interest.

17. The system of claim 15, wherein comparing the indegree and the outdegree comprises selecting at least one first peak of the sub-graph, of which the indegree is greater than the outdegree.

* * * * *